Oct. 23, 1934.  W. H. BATCHLER  1,978,124
COMBINATION TOOL
Filed May 27, 1932  2 Sheets-Sheet 2
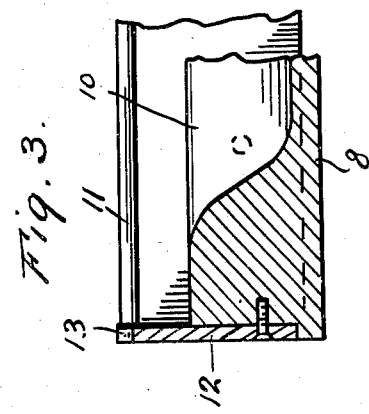
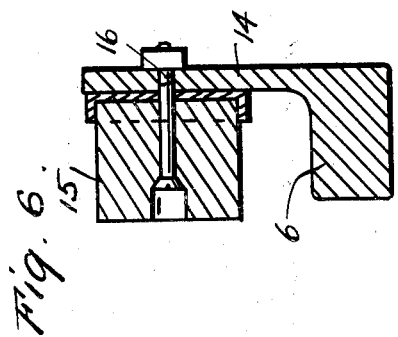
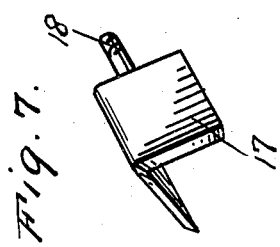
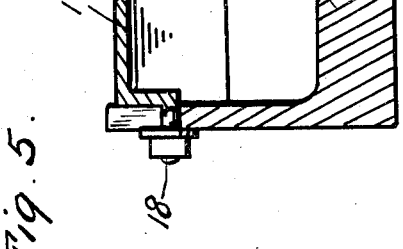
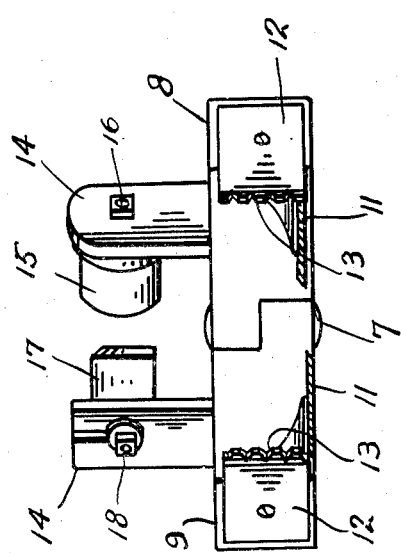
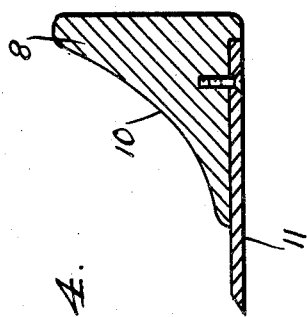
Inventor
W. H. Batchler
By Clarence A. O'Brien
Attorney Patented Oct. 23, 1934

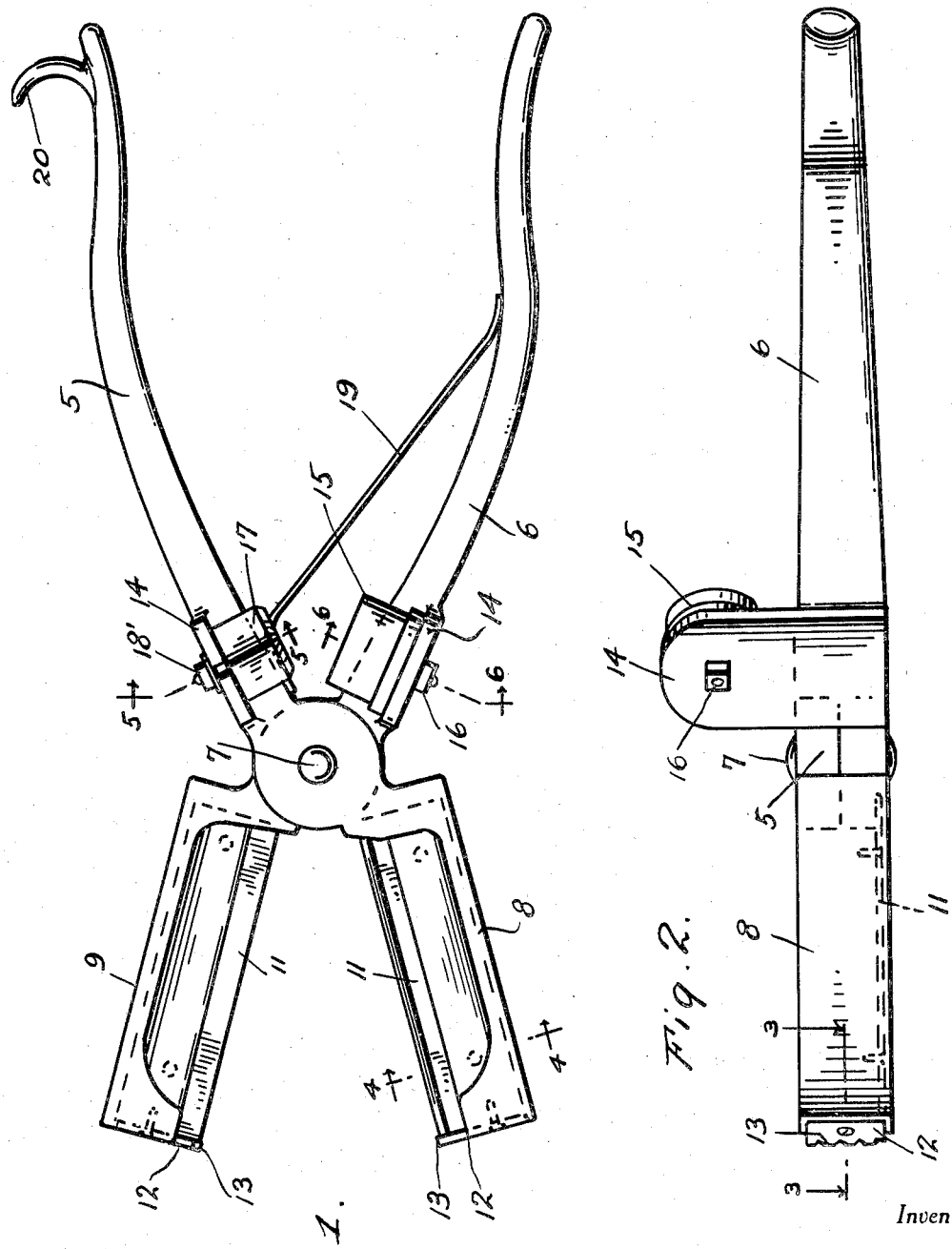

1,978,124

UNITED STATES PATENT OFFICE 1,978,124

COMBINATION TOOL

William H. Batchler, Palo Pinto, Tex.

Application May 27, 1932, Serial No. 614,009

2 Claims. (Cl. 128—316)

This invention appertains to new and useful improvements in combination tools, and more particularly to a novel tool for implements for emasculating, ear marking and docking lambs and kid goats.

The principal object of the invention is to provide a tool whereby a considerable number of animals can be treated without inconvenience to the operator and with less pain to the animals subjected.

Other important objects and advantages of the invention will become apparent to the reader of the following specification.

In the drawings:—

Figure 1 represents a top plan view of the novel tool.

Fig. 2 represents a side elevational view of the tool.

Fig. 3 represents a fragmentary detailed sectional view taken substantially on line 3—3 of Fig. 2.

Fig. 4 represents a cross sectional view taken substantially on line 4—4 of Fig. 1.

Fig. 5 represents a cross sectional view taken substantially on line 5—5 of Fig. 1.

Fig. 6 represents a sectional view taken substantially on line 6—6 of Fig. 1.

Fig. 7 represents a perspective view of the ear marker.

Fig. 8 represents a forward end elevational view of the tool.

Referring to the drawings wherein like numerals designate like parts, it can be seen that the tool is of the general cross handle type, the numerals 5—6 representing the handles crossed and connected together by a suitable pin or rivet 7. The forward ends of the handles 5—6 are constructed to form jaws 8—9, respectively, each of which is dished out on the inner side as at 10. (See Fig. 4).

To the lower side of each of these tools 8—9 is secured a blade 11 and these blades cut as do shears or scissors, the same being on slightly spaced planes as shown in Fig. 8.

To the outer ends of these jaws 8—9 is secured a plate 12, the inner edge of which is serrated as at 13. On the forward ends of each handle 5—6 adjacent the pivot pin 7 is an upstanding ear 14. Each of these ears is apertured. A block 15 of wood or some other similar material has a bolt passing therethru and through the opening in the corresponding ear 14 and a nut 16 is engageable thereon for securing the block to the inner side of the ear.

To the other ear 14 a V-shaped cutter 17 is secured by passing the threaded shank 18 thereof through the opening in the ear 14 and applying a nut 18' thereto, and against the ear 14. A leaf spring 19 is interposed between the handles 5—6 for maintaining the jaws 8 and 9 normally spaced apart as shown in Fig. 1.

Numeral 20 represents a hook on one of the handles, preferably the handle 5, to serve as a finger abutment.

In use, the V-shaped cutter 17 is used for marking the ears of animals as a source of identification. The blades 11 serve to open up the sacks on male animals so that the same can be seeded and on small animals whose seeds are quite small, the sacks are opened by the blades 11, but the serrated plates 12 are brought together against the smaller seeds. By clamping the serrated plates against the seeds and pulling out on the tool, the seeds can be readily extracted.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:

1. A tool of the character described comprising a pair of pivotally connected handles, a laterally disposed lug on each handle adjacent its pivotal end and at the inner side of the pivotal connection, said lugs projecting from said handles at the outermost side portions thereof, and complementary ear marking elements on the opposed sides of the said lugs.

2. A tool of the character described comprising a pair of pivotally connected handles, a laterally disposed lug on each handle adjacent its pivotal end and at the inner side of the pivotal connection, said lugs being each provided with an ear marking element, said ear marking elements being in opposed relation.

WILLIAM H. BATCHLER.